Dec. 13, 1960     A. T. COURT     2,963,936
REAR VISION MEANS HAVING PRISMATIC WINDOW
Original Filed Nov. 6, 1952
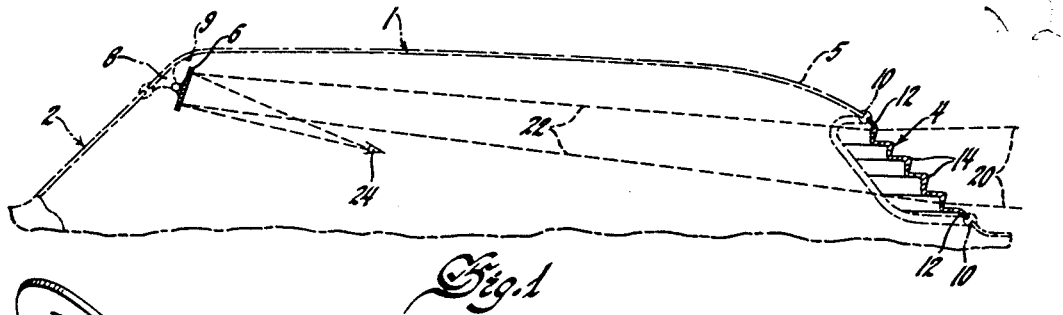
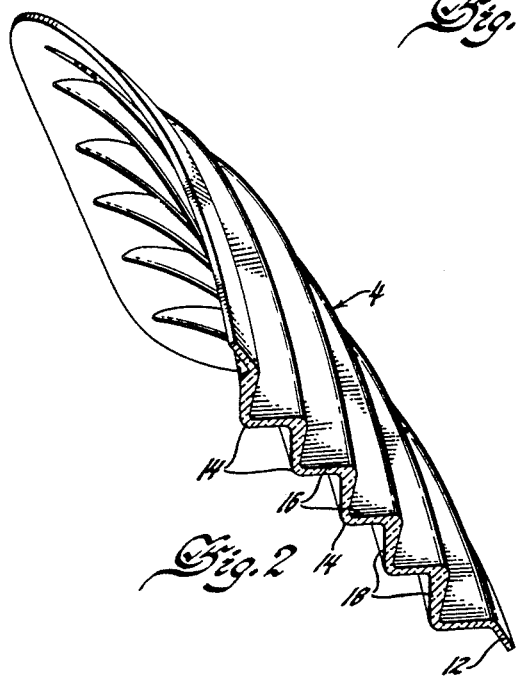
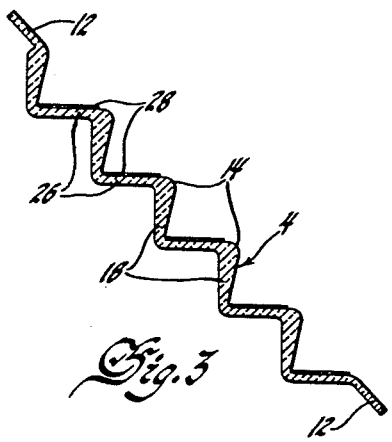
Inventor
Andrew T. Court
By
Willis, Helmig & Caillio
Attorneys

United States Patent Office 2,963,936
Patented Dec. 13, 1960

2,963,936

REAR VISION MEANS HAVING PRISMATIC WINDOW

Andrew T. Court, Detroit, Mich., assignor to General Motors Corporation, Detroit, Mich., a corporation of Delaware Original application Nov. 6, 1952, Ser. No. 319,048. Divided and this application Nov. 9, 1956, Ser. No. 621,422

1 Claim. (Cl. 88—1)

The present invention is a division of my copending application S.N. 319,048, filed November 6, 1952, now abandoned, and relates to windows for automotive vehicles and, more particularly, to prismatic rear windows for improving the vehicle operator's view of the road behind the vehicle. The present trend in automotive engineering is towards increasing the visibility of the operator and occupants of the vehicle. This has resulted in the windshields becoming of ever increasing proportions. To further promote improved vision, it has also been found desirable to prevent an obstruction in the line of forward vision by placing the rear view mirror above or below the top or bottom edges of the windshield. Since the windshield and rear window lie in substantially the same general horizontal plane the placing of the mirror above or below the windshield causes the line of rear vision to be inclined to a marked degree. This causes the field of vision to be restricted to a relatively small area of the road immediately behind the vehicle. However, when the light striking the mirror is that which travels substantially parallel to the road, the view is unlimited. Furthermore, as the rear window is inclined at a marked angle with the vertical, as is the present trend, any irregularities in the window will result in distorting the driver's vision.

It is an object of the present invention to provide means for allowing a rear view mirror to be placed above the level of the top or below the level of the bottom of a vehicle rear window and still allow the field of vision behind the vehicle to be substantially parallel to the road.

It is an object to provide a rear window which will permit the rear vision mirror of a vehicle to be mounted at a sufficient elevation inside of the vehicle to cause the vehicle operator's rearward line of sight to be over the heads and shoulders of other occupants of the front seat of the vehicle.

It is also an object to provide a generally inclined vehicle rear window in which the optically important surfaces are substantially vertical so as to reduce accumulations of dirt and sleet, optical distortion, and distracting reflections.

Figure 1 is a side sectional elevational view of an automobile body showing a preferred form of the present invention.

Fig. 2 is a partially broken away perspective view of the rear window shown in Fig. 1.

Fig. 3 is a vertical sectional elevational view of a different modification of the present invention.

Referring to the drawings in more detail, the numeral 1 represents generally an automobile having a windshield 2 and rear window 4 mounted in the body portion 5 thereof. To facilitate viewing the area of the road (not shown) behind the vehicle 1, a mirror 6 is provided which is swingably mounted upon a bracket 8. In the present instance, bracket 8 is secured to the body 5 immediately above windshield 2 and projects rearwardly and downwardly from the top portion 9 of said body. It is to be understood that although the mirror 6 in the embodiment shown is disposed above the windshield 2, the invention is equally applicable to installations wherein the mirror 6 is mounted below the windshield 2. Window 4 is mounted in the rear portion of the body 5 and is held in position by any suitable means, such as by a rubber grommet 10. Grommet 10 is channeled around the inner and outer edges thereof to receive the flange 12 extending around window 4 and the edge of the window opening in body 5, respectively.

The window 4 is comprised of the perimetral mounting flange 12 and a transparent portion having a plurality of substantially horizontal steps 14 which extend transversely of the window between said flange. The mounting flange 12 may be merely a continuation of the transparent portion or it may be constructed of other material which is secured to said portion. In either construction the flange 12 should be adapted to readily receive the grommet 10 so as to facilitate mounting the window in proper position on the body 5. The steps 14 comprise a series of alternately disposed horizontal portions 16 and vertical or riser portions 18. The vertical or riser portions 18 of the window 4 include a transparent light refracting material for bending the rays of light the desired amount. Refraction of the light rays may be accomplished by tapering the risers 18 so as to form a series of vertically spaced prisms substantially as shown. It is desirable that the prism be so proportioned that light traveling parallel to the road, as represented by dotted lines 20, will be refracted only enough to strike the mirror 6, as represented by the dotted lines 22. In the present instance, since the mirror 6 is above the windshield 2, it is necessary to bend the light rays slightly upwardly. This may be done as herein shown by forming the inner and outer walls of each riser 18 so as to diverge slightly from the lower to the upper ends thereof.

Since the portions 16 of the window 4 are substantially horizontal, they do not transmit any light to the mirror 6. However, to present an undistorted and unbroken view, they should be disposed in planes which are parallel to the direction in which light travels from the object to be viewed. Thus, it can be seen that although the rear window 4, the operator's eye 24 and the mirror 6 are not in a common horizontal plane, it is possible for the operator to obtain an unobstructed view of the road for any desired distance behind the car. Moreover, since the line of observation is substantially normal to the surface of the window, the effects of any irregularities therein will be minimized. Therefore, by utilizing a stepped window it is possible to have the rear window inclined to a very marked degree with a minimum amount of visual distortion from optical deformities in the window.

Fig. 3 shows a slight modification of the preferred embodiment. In this construction a perimetral mounting flange 12 is also provided which is substantially the same as that shown in Figs. 1 and 2. In addition, the riser portions 18 also have essentially the same prismatic shape as those previously described. However, since no horizontal light striking the mirror 6 passes through the tread portions 16, the said tread may be made opaque. This will prevent light which is traveling in a generally downward direction such as the direct rays of the sun from entering the interior of the car 1, but at the same time it is still possible for the driver 24 to have an unobstructed view in the horizontal direction. To accomplish this, a rear window 4 substantially the same as in the preferred form is employed, and the tread portions 26 are covered with a coating 28 of any suitable opaque substance such as paint. By so constructing the window 4 the interior of the vehicle is shielded from the direct rays of the sun. Undue heating of the vehicle is thus prevented and glare and eye strain caused by excessive light is greatly diminished.

In each of the embodiments shown herein the window 4 has been provided with one or more prisms having the greatest cross-sectional width on the upper end thereof so that the light rays passing therethrough will be refracted upwardly in the direction of the rear view mirror. However, should it be desired to mount the rear view mirror beneath the windshield instead of deflecting the rays upwardly, they now should be deflected downwardly. Thus, it is clear from the disclosure herein that this might be accomplished by reversing the position of the window 4 so as to bring the end of each prism of least cross-sectional width at the top of the prism and the end of greatest cross-sectional width at the bottom.

What is claimed is:

A transparent window adapted to be mounted in an opening in the rear wall of a passenger compartment of an automotive vehicle for transmitting light from the area behind said vehicle to a mirror in the front of said passenger compartment, said window comprising a stepped transparent center portion and a peripheral mounting flange extending therearound, said flange being adapted to be secured to said vehicle for retaining said light transmitting portion in said opening, said stepped transparent center portion comprising inner and outer window walls forming a series of horizontal opaque treads and a series of transparent vertical prisms formed integral therewith, said prisms extending horizontally across said window and being positioned to refract substantially horizontal parallel light rays from said area upwardly to strike said mirror to form a substantially uninterrupted image for an occupant in said compartment.

References Cited in the file of this patent

UNITED STATES PATENTS

| | | |
|---|---|---|
| 246,626 | Morse | Sept. 6, 1881 |
| 721,258 | Wadsworth | Feb. 24, 1903 |
| 1,907,800 | Harington | May 9, 1933 |
| 2,135,262 | Schumacher | Nov. 1, 1938 |
| 2,146,182 | Guyer | Feb. 7, 1939 |
| 2,384,540 | Flint | Sept. 11, 1945 |
| 2,679,179 | Falge | May 25, 1954 |
| 2,714,816 | Pennell | Aug. 9, 1955 |

FOREIGN PATENTS

| | | |
|---|---|---|
| 11,054 | Great Britain | of 1908 |
| 429,340 | Great Britain | May 27, 1935 |
| 790,905 | France | Sept. 16, 1935 |